United States Patent [19]

Sugasawa et al.

[11] Patent Number: 5,149,131

[45] Date of Patent: Sep. 22, 1992

[54] HYDRAULIC DAMPING DEVICE FOR VEHICLES

[75] Inventors: Fukashi Sugasawa; Masatsugu Yokote; Tomohiro Yamamura, all of Kanagawa, Japan

[73] Assignee: Nissan Motor Co., Ltd., Yokohama, Japan

[21] Appl. No.: 698,903

[22] Filed: May 13, 1991

[30] Foreign Application Priority Data

May 14, 1990 [JP] Japan .................................. 2-123723

[51] Int. Cl.$^5$ .............................................. B62D 9/02
[52] U.S. Cl. .................................... 280/772; 280/707; 280/714
[58] Field of Search ..................... 280/840, 6.11, 6.12, 280/772, 707, 714, DIG. 1

[56] References Cited

U.S. PATENT DOCUMENTS

| | | | |
|---|---|---|---|
| 3,572,746 | 3/1971 | Mueller | 280/6.12 |
| 3,917,307 | 11/1975 | Shoebridge | 280/6.12 |
| 4,050,704 | 9/1977 | Duca et al. | 280/714 |
| 4,606,551 | 8/1986 | Toti et al. | 280/772 |
| 4,752,062 | 6/1988 | Domenichini | 280/714 |

FOREIGN PATENT DOCUMENTS 60-76506 5/1985 Japan .

Primary Examiner—Kenneth R. Rice
Attorney, Agent, or Firm—Foley & Lardner

[57] ABSTRACT

A damping device is installed between a vehicle body and desired two of wheels and provided with a damping force producing mechanism for producing a larger damping force when the two wheels make strokes involving a relative movement therebetween, such as at the time of rolling, pitching, etc. than when the two wheels make strokes without involving any substantial relative movement therebetween, such as at the time of bouncing. In one embodiment, the damping force producing mechanism comprises a pair of restrictions in communication with cross conduits interconnecting upper and lower cylinder chambers. The conduits and cylinder chambers are arranged so as to cause a larger flow rate of fluid to pass through the restrictions when the wheel strokes involve a relative movement between the wheels than when the wheel strokes does not involve such relative movement.

22 Claims, 6 Drawing Sheets

HYDRAULIC DAMPING DEVICE FOR VEHICLES

BACKGROUND OF THE INVENTION

1. Field of the Invention

The present invention relates to a hydraulic damping device for damping vehicle oscillations such as roll, pitch, bounce, etc. and particularly to the type capable of producing a variable damping force in accordance with a kind of oscillation, i.e., whether an oscillation causes relative vertical movement between two wheels, such as roll, pitch, etc. or does not cause such relative movement, such as bounce, etc.

2. Description of the Prior Art

An example of a damping device for damping a vehicle oscillation is disclosed in Japanese Provisional Publication No. 60-76506.

This prior art device is incorporated in a suspension system and includes a pair of single rod-double acting hydraulic cylinders installed between a vehicle body and respective suspension arms. The hydraulic cylinders are interconnected by cross conduits in such a manner that an upper cylinder chamber of one hydraulic cylinder is communicated with a lower cylinder chamber of the other. The cross conduits are respectively provided with orifices or restrictions and further provided, at locations between the upper cylinder chambers and the restrictions, with spring type mechanical accumulators for pressurizing the hydraulic fluid in the conduits and the cylinders, respectively.

In the prior art device, the restrictions are installed in the cross conduits to restrict flow of hydraulic fluid therethrough during both rolling and bouncing. Accordingly, the prior art device provides a damping force even during bouncing, causing a stiff or rough riding feel and therefore a deteriorated or impaired riding comfort of the vehicle.

SUMMARY OF THE INVENTION

In accordance with the present invention, there is provided a novel and improved damping device which for a vehicle.

The vehicle has a plurality of wheels and a vehicle body.

The damping device comprises actuator having a pair of fluid cylinders installed between the vehicle body and two of the wheels, the cylinders having cylinder chambers, and conduit means for interconnecting the cylinder chambers, and damping force producing means fluidly connected to the cylinder chambers and the conduit means for producing a damping force in proportion to a flow rate of fluid therethrough.

The actuator is adapted to causes a larger flow rate of fluid to pass through the damping force producing means when the two wheels make strokes involving a relative movement therebetween than when the two wheels make strokes without involving any substantial relative movement therebetween.

The above structure is effective for solving the above noted problems inherent in the prior art device.

It is accordingly an object of the present invention to provide a novel and improved damping device for a vehicle which can produce a desired large damping action for roll, pitch, etc. without impairing the riding comfort.

It is a further object of the present invention to provide a novel and improved damping device of the above described character which can produce a larger damping force at the time of rolling, pitching, etc. than at the time of bouncing of the vehicle.

It is a further object of the present invention to provide a novel and improved damping device of the above described character which is desirable from the safety driving point of view.

DETAILED DESCRIPTION OF THE PREFERRED EMBODIMENTS

Figure 1:
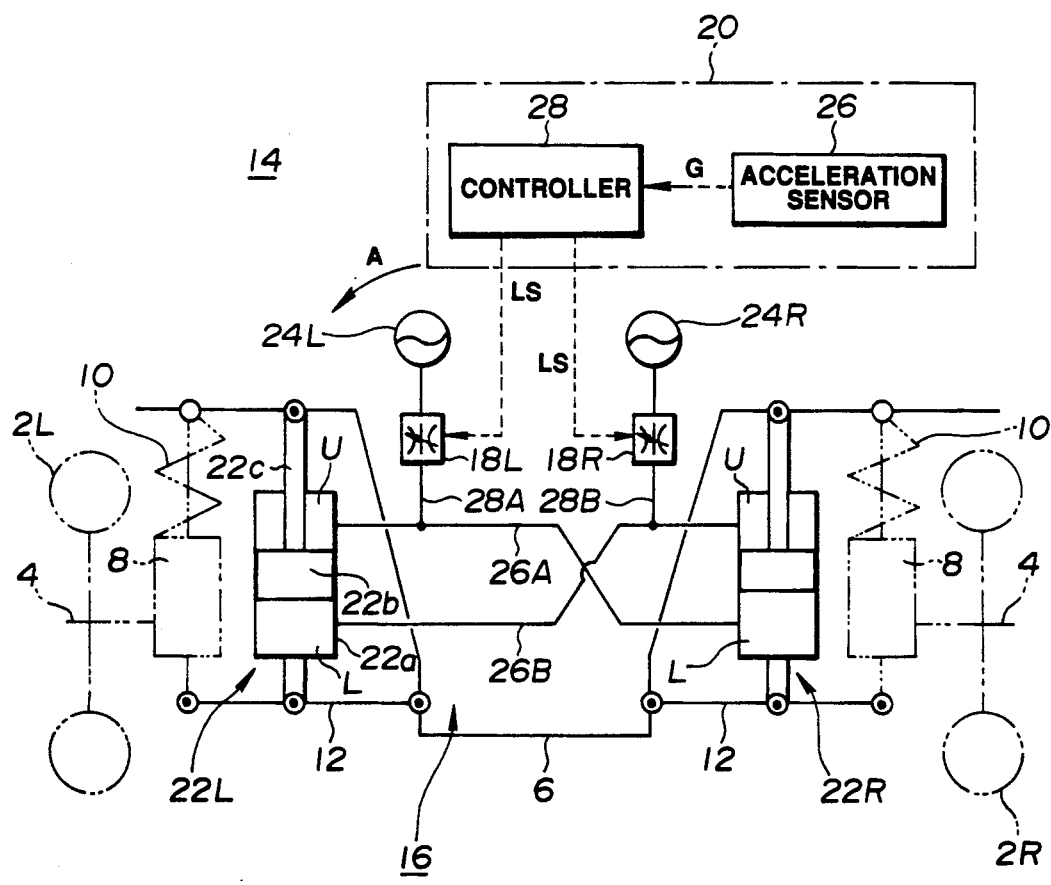
FIG. 1 is a schematic view of a hydraulic damping device according to an embodiment of the present invention.

Referring first to FIG. 1, a vehicle includes laterally opposed left and right wheels 2L and 2R when viewed at the rear of the vehicle, wheel supporting members 4 and 4, and a vehicle body 6. Installed between the respective wheel supporting members 4, 4 such as spindles or axles and the vehicle body 6 are shock absorbers 8 and 8 in such a manner as to be axially expansible and contractible. Coil springs 10 are installed between portions of the shock absorbers 8 and 8 which respectively constitute parts of the sprung and unsprung portions of the vehicle. Further, installed between the respective wheel supporting members 4, 4 and the vehicle body 6 are lower control arms or suspension arms 12 and 12 serving as suspension links. The lower arms 12 and 12 are pivotally installed at one ends on the vehicle body 6 to pivot up and down in response to up-and-down movement of the wheel supporting members 4 and 4.

The vehicle is provided with a damping device 14 which can also serve as a stabilizer. The damping device 14 includes an actuator 16 installed between the respective lower arms 12, 12 and the vehicle body 6, variable orifices or restrictions 18L and 18R incorporated in the actuator 16 to serve as a variable damping force producing mechanism, and a control unit 20 for controlling the operations of the variable restrictions 18L and 18R and thereby controlling the damping forces produced thereby.

The actuator 16 includes hydraulic cylinders 22L and 22R, hydropnuematic accumulators 24L and 24R, and first hydraulic conduits 26A and 26B and second hydraulic conduits 28A and 28B for connecting the cylinders 22L, 22R and accumulators 24L and 24R with each other.

The hydraulic cylinders 22L and 22R are of the single rod-double acting type and each includes a cylinder tube 22a, a piston 22b slidable in the cylinder tube 22a and separating the inside thereof into two cylinder chambers, i.e., an upper cylinder chamber U and a lower cylinder chamber L, and a piston rod 22c fixed to the piston 22b. The piston rods 22c and 22c of the hydraulic cylinders 22L and 22R are pivotally attached to the vehicle body 6 while the cylinder tubes 20a and 20a are pivotally attached to the lower arms 12 and 12 such that the hydraulic cylinders 22L and 22R are installed upright between the sprung and unsprung portions of the vehicle.

The upper cylinder chamber U of the left wheel side hydraulic cylinder 22L is connected through the first hydraulic conduit 26A to the lower cylinder L of the right wheel side hydraulic cylinder 22R. On the other hand, the lower cylinder chamber L of the left wheel side hydraulic cylinder 22L is connected through the first hydraulic conduit 26B to the upper cylinder chamber U of the right wheel side hydraulic cylinder 22R. The first hydraulic conduits 26a and 26B thus constitute a cross arrangement and are respectively connected at axially intermediate portions thereof with second hydraulic conduits 28A and 28B. The second hydraulic conduits 28A and 28B are in turn connected to the accumulators 24L and 24R and provided, at axially intermediate portions thereof, with the variable restrictions 18L and 18R, respectively.

Though not shown, the variable restrictions 18L and 18R each include a solenoid, a plunger movable in response to a control signal LS supplied to the solenoid, and a spool movable together with the plunger for varying a restriction opening.

The damping force producing mechanism 20 in this embodiment includes a lateral acceleration sensor 26 for detecting a lateral acceleration of the vehicle and producing a signal G representative of a detected lateral acceleration, and a controller 28 for supplying control signals LS and LS to the variable restrictions 18L and 18R in accordance with the signal G supplied thereto from the lateral acceleration sensor 26. More specifically, the controller 28 consists of a microcomputer and computes control signals LS and LS for reduction of restriction opening when the signal G representing a detected lateral acceleration is smaller than a predetermined value and supplies the signals LS and LS through a drive circuit to the variable restrictions 18L and 18R.

Figure 2:
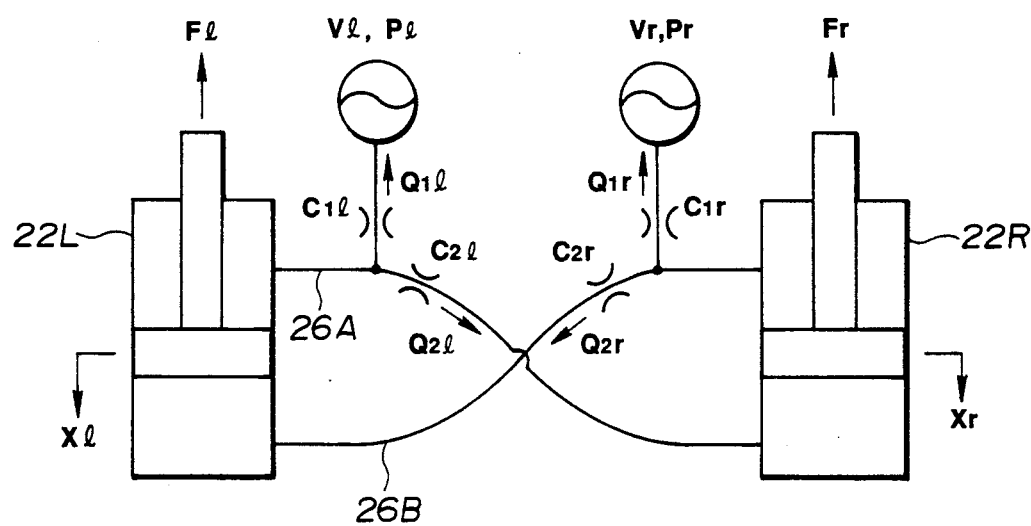
FIG. 2 is a schematic view of an equivalent hydraulic circuit, of the device of FIG. 1.

Referring to FIG. 2, the damping device 14 of FIG. 1 will be described further with respect to restriction effect produced thereby. In the figure, xl and xr indicate cylinder strokes, Fl and Fr indicate axial forces of the piston rods 22c and 22c, C1*l* and C1*r*, indicate damping coefficients of the variable restrictions 18L and 18R (including the damping effect by the second hydraulic conduits 28A and 28B), C2*l* and C2*r* indicate equivalent damping coefficients of the first hydraulic conduits 26A and 26B, Q1*l* and Q1*r* are quantities of hydraulic fluid flowing through the restrictions 18L and 18R, Q2*l* and Q2*r*, are quantities of hydraulic fluid flowing through the first hydraulic conduits 26A and 26B, Pl and Pr are pressures of the gas filled in the accumulators 24L and 24R, Vl and Vr are volumes of the gas filled in the accumulators 24L and 24R, Ar indicates the cross sectional area of the piston rod 22c, Ac indicates the cross sectional area of the chamber of the cylinder tube 22a, and $A = Ac - Ar$.

Figure 3:
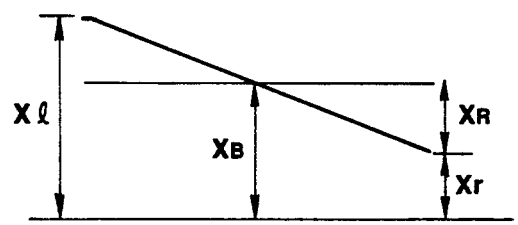
FIG. 3 is a graphic representation of roll and bounce of a vehicle.

Referring to FIG. 3, an average cylinder stroke XR at the time of rolling and an average cylinder stroke XB at the time of bouncing are obtained from:

$$XR = \frac{Xl - Xr}{2}, XB = \frac{Xl + Xr}{2} \quad (60)$$

In this instance, assuming that $2XR = XR$ and $2XB = XB$, $$XR = Xl - Xr, XB = Xl + Xr \quad (1)$$

Thus, $$Xl = \frac{XR + XB}{2}, Xr = \frac{XB - XR}{2} \quad (2)$$

Then, the restriction effect due to the damping coefficients C1*r* and C1*l* will be calculated as follows.

The hydraulic fluid quantities Q1*r* and Q1*l* are obtained from:

$$\begin{aligned} Q1r &= (A + Ar)\dot{X}l - A\dot{X}r \\ &= (A + Ar/2)\dot{X}R + (Ar/2)\dot{X}B \end{aligned} \quad (3)$$

$$\begin{aligned} Q1l &= (A + Ar)\dot{X}r - A\dot{X}l \\ &= -(A + Ar/2)\dot{X}R + (Ar/2)\dot{X}B \end{aligned} \quad (4)$$

Pressure increases $\Delta p1l$ and $\Delta p1r$ due to the restrictions 18L and 18R are obtained from:

$$\Delta p1l = Q1l \cdot C1l, \Delta p1r = Q1r \cdot C1r \quad (5)$$

Thus, assuming that $C1l = C1r = C1$, the axial forces Fl1 and Fr1 are obtained from:

$$\begin{aligned} Fl1 &= \Delta p1r(A + Ar) - \Delta p1lA \\ &= \{Q1r(A + Ar) - Q1lA\}C1 \end{aligned} \quad (6)$$

$$\begin{aligned} Fr1 &= \Delta p1l(A + Ar) - \Delta p1rA \\ &= \{Q1l(A + Ar) - Q1rA\}C1 \end{aligned} \quad (7)$$

Accordingly, from the expressions (6), (7) and the expressions (3), (4), the damping force Fl1 − Fr1 for roll and the damping force fl1 + Fr1 for bounce are given as follows:

$$Fl1 - Fr1 = (2A + Ar)^2 C1 \dot{X}_R \quad (8)$$

$$Fl1 + Fr1 = Ar^2 C1 \dot{X}_B \quad (9)$$

Similarly, the restriction effect due to the damping coefficients C2*l* and C2*r* will be calculated as follows.

Firstly, the hydraulic fluid quantities Q2*l* and Q2*r* are obtained from:

$$Q2l = -\dot{X}r(A + Ar) \quad (10)$$

$$Q2r = -\dot{X}l(A + Ar) \quad (11)$$

Then, the axial forces for balancement with the pressure losses are obtained form:

$$Fl2 = -Q2rC2r(A + Ar) \quad (12)$$

$$Fr2 = -Q2lC2l(A + Ar) \quad (13)$$

Then, assuming that $C2r = C2l = C2$, $$Fl2 - Fr2 = (A + Ar)^2 C2 \dot{X}R \quad (14)$$

$$Fl2 + Fr2 = (A + Ar)^2 C2 \dot{X}B \quad (15)$$

As a result, as to the damping coefficients C1*l* and C1*r*, it will be understood from the expressions (8) and (9) that a larger damping force, i.e., a larger restriction is attained at the time of rolling which involves a relative movement between two wheels than at the time of bouncing which does not involve such relative movement. Further, as to the damping coefficients $C_{2l}$ and $C_{2r}$, it will be understood from the expressions (14) and (15) that both damping coefficients cause damping forces in accordance with average speeds $\dot{X}_R$ and $\dot{X}_B$. However, since the damping coefficients $C_{2l}$ and $C_{2r}$ of the conduits 26A and 26B are smaller as compared with those of the restrictions 28A and 28B, the resulting restriction effects are smaller.

In the foregoing, while the description has been made as to roll and bounce, the present invention can produce a similar effect with respect to pitch and bounce when the two wheels are front and rear wheels on the same lateral side of the vehicle and with respect to pitch, roll and bounce when the two wheels are diagonally arranged front and rear wheels.

The operation of this embodiment will be described hereinbelow.

When the vehicle is running straight at a constant speed on a paved, flat road, the lateral acceleration sensor 26 produces a signal G=0. Thus, the controller 28 produces control signals LS and LS for turning off the variable orifices 18L and 18R, i.e., deenergizing the solenoids thereof and thereby allowing the same to become of a predetermined opening. Under this running condition, no substantial bound and rebound of the wheels 2L and 2R are caused, thus causing no substantial stroke variation of the left and right hydraulic cylinders 22L and 22R and therefore no substantial flow of hydraulic fluid through the conduits 26A, 26B, 28A and 28B. Accordingly, no substantial springy reactions are caused by the accumulators 24L and 24R, and therefore no substantial damping forces are caused by the variable restrictions 18L and 18R and the conduits 26A, 26B, 28A and 28B.

When a bounce is caused due to a protruded and recessed road surface portion during straight running of the vehicle, the lateral acceleration sensor 26 still produces a signal G=0, thus not causing any variation of the damping coefficients of the variable restrictions 18L and 18R. In this connection, when running over a protruded road surface portion causes the both wheels 2L and 2R to bound concurrently for thereby causing the pistons 22b and 22b of the hydraulic cylinders 22L and 22R to move upward relative to the vehicle body 6, the lower cylinder chambers L and L are compressed concurrently while the upper cylinder chambers U and U are put into a vacuum condition. By this, the hydraulic fluid in the lower chamber L of one cylinder 22R or 22L is caused to flow through the first hydraulic conduit 26A or 26B into the upper chamber U of the opposite cylinder 22L or 22R while a quantity of hydraulic fluid corresponding to an increased volume of rod 22C within the upper cylinder chamber U is caused to flow through the variable restrictions 18L or 18R into the accumulators 24L or 24R.

On the contrary, when running over a recessed road surface portion causes the both wheels 2L and 2R to rebound and therefore the upper cylinder chambers U and U are compressed together, the hydraulic fluid at this time flows from the upper cylinder chambers U and U through the first hydraulic conduits 26A and 26B into the lower cylinder chambers L and L while a quantity of hydraulic fluid corresponding to a reduced volume of the rods 22c and 22c within the upper chambers U and U flows from the accumulators 24L and 24R through the variable restrictions 18L and 18R into the lower cylinder chambers L and L.

However, since the quantities of hydraulic fluid passing the variable restrictions 18L and 18R at such bound and rebound are far smaller than the quantity of hydraulic fluid passing the first hydraulic conduits 26A and 26B and furthermore the variable restrictions 18L and 18R are under a controlled condition of having small damping coefficients, the resulting damping force is small, thus allowing the overall damping force of the vehicle to depend nearly entirely upon the shock absorbers 8 and 8. Due to this, as compared with an arrangement in which the first hydraulic conduits 26A and 26B are otherwise provided with restrictions, a resulting damping force and a resulting springy reaction are smaller and therefore substantial no deterioration of riding comfort is caused.

When the vehicle comes to turn around a corner and, for example, makes its turn to the right, there arises such a roll as indicated by the arrow A in FIG. 1 for causing the left wheel 2L side, when viewed at the rear of the vehicle, of the vehicle to dive and the right wheel 2R side to rise. In this instance, the lateral acceleration sensor 26 detects the inertia and supplies to the controller 28 a signal G which is representative no only the absolute value of the acceleration but the direction of turning. When the vehicle is making a rapid turn, the control signals LS and LS for turning on the variable restrictions 18L and 18R, i.e., energizing the solenoids thereof, is produced. By this, the opening of the variable restrictions 18L and 18R are reduced to a predetermined value.

Together with the above, the left wheel side hydraulic cylinder 22L reduces its stroke or length in proportion to the rolling speed while the right wheel side cylinder 22R increases its stroke or length. Due to this, the lower cylinder chamber L of the left wheel side hydraulic cylinder 22L and the upper cylinder chamber U of the right wheel side hydraulic cylinder 22R are compressed concurrently while the upper cylinder chamber U of the left wheel side hydraulic cylinder 22L and the lower cylinder chamber L of the right wheel side hydraulic cylinder 22R are expanded concurrently. Thus, a large quantity of hydraulic fluid in the lower cylinder chamber L of the left wheel side hydraulic cylinder 22L and the upper cylinder chamber U of the right wheel side hydraulic cylinder 22R flows through the variable restriction 18R into the accumulator 24R while a large quantity of hydraulic fluid in the accumulator 24L flows through the variable restriction 18L into the upper cylinder chamber U of the left wheel side hydraulic cylinder 22L and into the lower cylinder chamber L of the right wheel side hydraulic cylinder 22R. By this, since it is attained, while attaining a springy reaction by means of the accumulators 24L and 24R, a restriction effect proportional to a flow rate of hydraulic fluid passing the variable restrictions 18L and 18R is attained, there is produced a damping force proportional to the strokes of the hydraulic cylinders 22L and 22R.

On the other hand, also the shock absorbers 8 and 8 each produce a damping force in accordance with a roll, whereby to suppress the diving of the left wheel side and the rising of the right wheel side of the vehicle for thereby holding the roll angle of the vehicle body 6 below a predetermined small value.

When the vehicle makes a turn to the left, operations similar to the above are obtained though reversed with respect to the left and right lateral sides of the vehicle.

Further, when an excessively large shock is applied to the hydraulic cylinders 22L and 22R due to running over a protruded or recessed road surface during cornering or bouncing, a pulse-like pressure variation is caused in the upper and lower cylinder chambers U and L of the hydraulic cylinders 22L and 22. This pressure variation however can be absorbed by the springy action of the accumulators 24L and 24R while a large damping force is caused at the restrictions 18L and 18R due to a flow of hydraulic fluid therethrough at high speed, thus making it possible to attain an efficient damping effect.

On the other hand, according to the present invention, it becomes possible to vary the load movement between the left and right sides of the vehicle freely, e.g., to increase the load movement between the left and right of the vehicle by increasing the roll rigidity during such cornering that involves a high lateral acceleration. Due to this, by installing on the vehicle at both the front and rear thereof the damping devices 14 of this embodiment and varying the allotment of the roll rigidities at the front and rear of the vehicle, i.e., load movement therebetween, the sum of the cornering forces at the front and rear of the vehicle can be varied for thereby varying the steering characteristic during cornering.

In the meantime, in the above described embodiment, the damping device 14 which also serves as a hydraulic stabilizer has been described and shown as being provided to the left and right wheels, this is not limitative but it can be applied to front and rear wheels at one lateral side of the vehicle or diagonally arranged two wheels, e.g., left front wheel and right rear wheel, right front wheel and left rear wheel. In this instance, the foregoing expressions (1) to (15) are applied to the selected wheels similarly to the above and control of the variable restrictions may be performed in accordance with an acceleration in the front-to-rear direction of the vehicle. By this, it becomes possible to obtain a smaller damping force at the time of bouncing at which the passenger of the vehicle does not feel so much uncomfort as compared with the time of other oscillations while assuredly providing a pitch damping force when the damping device 14 is applied to the front and rear wheels on the same lateral side of the vehicle and a both pitch and roll damping force when the damping device 14 is applied to the diagonally arranged front and rear wheels.

Further, in the above described embodiment, fixed restrictions may be used in place of the variable restrictions 18L and 18R. Further, in place of the lateral acceleration sensor, a steering wheel rotation angle sensor and a vehicle speed sensor can be used for estimating a lateral acceleration on the basis of the detection thereof and controlling the restrictions in accordance with the estimated value.

Figure 4:
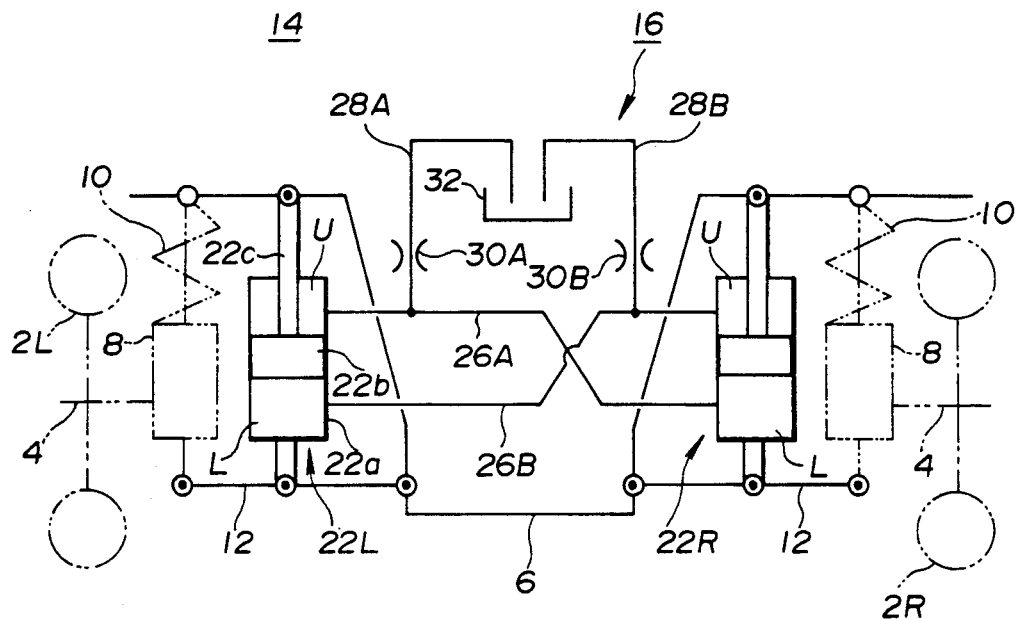
FIGS. 4 to 11 are schematic views of modifications of the present invention.

Referring to FIG. 4, in which like and corresponding parts to those of the previous embodiment of FIGS. 1 to 3 are designated by like reference characters, a modified embodiment will be described.

In this embodiment, the second hydraulic conduits 28A and 28B are connected through respective fixed restrictions 30A and 30B of a predetermined orifice diameter to a reservoir 32. Except for the above, this embodiment is substantially similar to the previous embodiment of FIGS. 1 to 3.

In this embodiment, accumulators for producing a springy reaction are not employed and the restrictions 30A and 30B have a constant damping coefficient. Thus, this embodiment can be simpler in structure as compared with the previous embodiment and therefore its manufacturing cost can be reduced. Further, at the time of rolling, a large quantity of hydraulic fluid is caused to flow into and out of the reservoir 32 for thereby attaining a large damping force by the restriction effect of the fixed restrictions 30A and 30B, whereas at the time of bouncing a small quantity of hydraulic fluid is caused to flow into and out of the reservoir 32 for thereby attaining a small damping force. This embodiment therefore can produce substantially the same effect to the previous embodiment of FIGS. 1 to 3.

Figure 5:
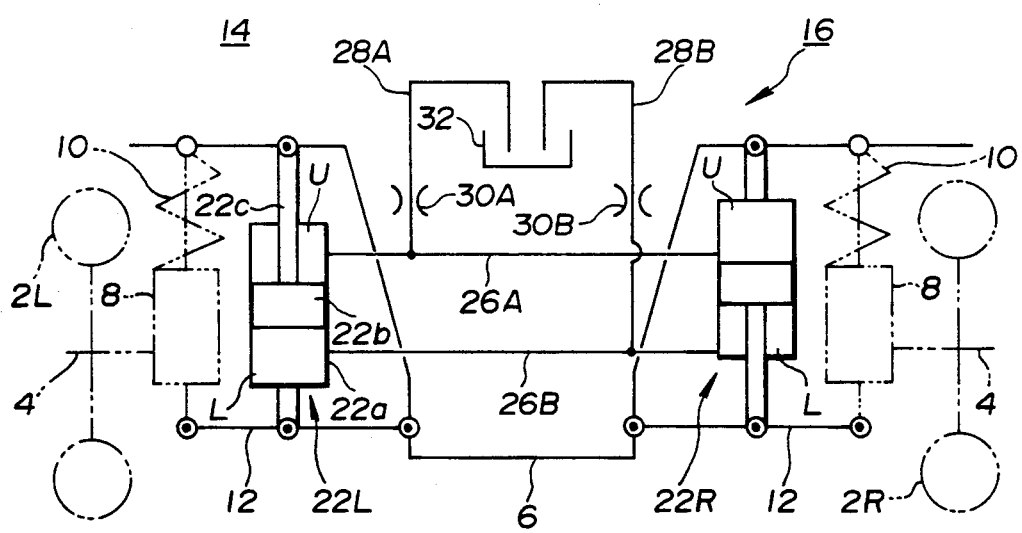

Referring to FIG. 5, in which like and corresponding parts to those of the previous embodiment of FIG. 4, a further modified embodiment will be described.

In this embodiment, the right wheel side hydraulic cylinder 22R is installed in an inverted manner as compared with the left wheel side hydraulic cylinder 22L. That is, the cylinder tube 22a is attached to the vehicle body 6 while the piston rod 22c is attached to the lower arm 12, and the upper cylinder chambers U and U are connected by the conduit 26A while the lower cylinder chambers L and L are connected by the conduit 26B. That is, the hydraulic conduits 26A and 26B are not arranged in a crossing manner but in a parallel manner.

Except for the above, this embodiment is substantially similar to the previous embodiment of FIG. 4 and can produce substantially the same effect.

Figure 6:
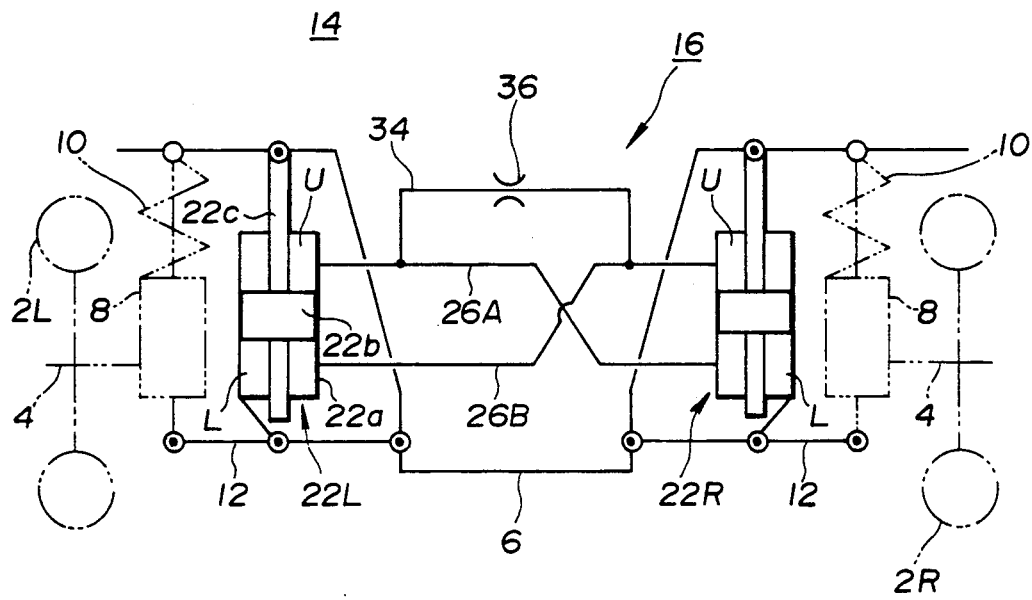

Referring to FIG. 6, in which like and corresponding parts to those of the previous embodiment of FIG. 4 are designated by like reference characters, a further modification will be described.

In this embodiment, the left and right hydraulic cylinders 22L and 22R are constructed to be of the double rod-double acting type. The upper piston rods 22c and 22c are attached to the vehicle body 6 while the lower piston rods 22d and 22d are free and extend though the cylinder tubes 22a and 22a. The cylinder tube 22a are attached at the lower ends to the lower arms 12 and 12, respectively.

Further, the hydraulic conduits 26A and 26B are connected to each other by an auxiliary conduit 34 having installed therein a single fixed restriction 36.

Except for the above, this embodiment is substantially similar to the previous embodiment of FIG. 4.

In operation, the volumetric variation rates of the upper and lower cylinder chambers U and L of each of the hydraulic cylinders 22L and 22R are the same due to the double rod-double acting type. Thus, when the left and right wheels make strokes of the same phase, i.e., a stroke of the same amount and in the same direction, at the time of bouncing, hydraulic fluid flows out, for example, from the upper cylinder chamber U and into the lower cylinder chamber L. In this instance, hydraulic fluid passes only the hydraulic conduits 26A and 26B and does not pass the auxiliary conduit 34. Thus, a damping force produced by the damping device 14 during bouncing depends only upon the flow resistance of the hydraulic conduits 26A and 26B. The damping force obtained at the time of bouncing is therefore smaller as compared with that of the previous embodiment of FIG. 4, thus enabling to attain a better riding comfort.

On the other hand, when the left and right wheels make strokes of the different phases, hydraulic fluid is caused to flow out from the upper and lower cylinder chambers U and L of one of the hydraulic cylinders 22L and 22R and flow through the fixed restriction 36 into the lower and upper cylinder chambers L and U of the other of the cylinders 22L and 22R. In this instance, by the restriction effect of the restriction 36, a damping force is produced to assuredly suppress the roll of the vehicle. In this connection, this embodiment produces substantially the same effect to the previous embodiments of FIGS. 4 and 5. Further, in the case of the hydraulic cylinders being of the double rod-double acting type, a quantity of hydraulic fluid in the conduits and cylinders are constant and therefore the hydraulic circuit can be of the closed type.

Figure 7:
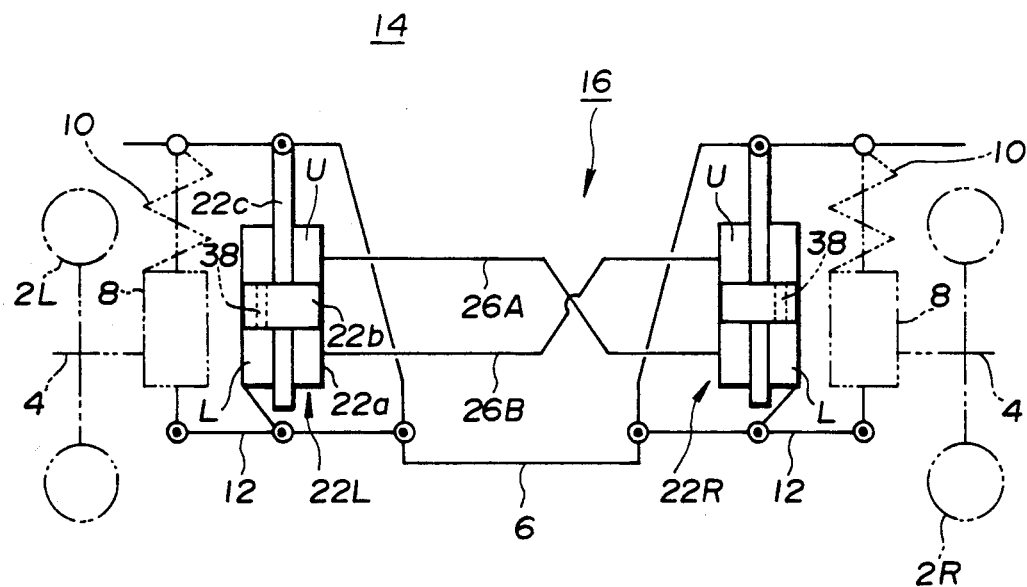

Referring to FIG. 7, in which like and corresponding parts to those of the previous embodiment of FIG. 6 are designated by like reference characters, a further modification will be described.

This embodiment differs from the previous embodiment of FIG. 6 in that the auxiliary conduit 34 is not employed and in place therefor the pistons 22b and 22b of the hydraulic cylinders 22L and 22R are formed with orifices 38 and 38 of a predetermined diameter so that the upper and lower cylinder chambers U and L are communicated with each other through the orifices 38 and 38.

This embodiment is the same from the topology point of view to the previous embodiment of FIG. 6 and therefore can produce substantially the same effect. Further, this embodiment can be simpler in structure than the embodiment of FIG. 6 and therefore its application not only to the laterally opposed left and right wheels but to the front and rear wheels on the same lateral side of the vehicle or to the diagonally arranged front and rear wheels can be attained with ease.

Figure 8:
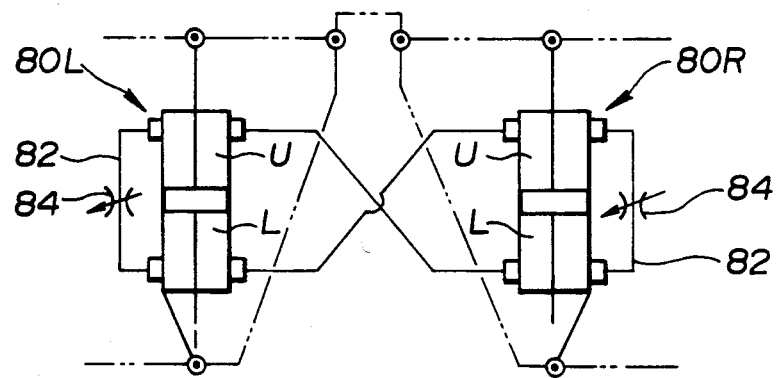

Further, the damping force producing mechanism can be constructed as shown in FIG. 8. In the structure of FIG. 8, left and right hydraulic cylinders 80L and 80R are constructed to be of the double rod-double acting type similarly to the embodiment of FIG. 7, and the upper and lower cylinder chambers U and L of each of the hydraulic cylinders 80L and 80R are connected by hydraulic conduits 82 and 82 in which variable restrictions 84 and 84 serving as a damping force producing mechanism are respectively installed. Thus, differing from the built-in restriction type of FIG. 7, the embodiment can be of the outside-installed restriction type. This embodiment of FIG. 8 can produce the same effect as the embodiment of FIG. 7.

Figure 9:
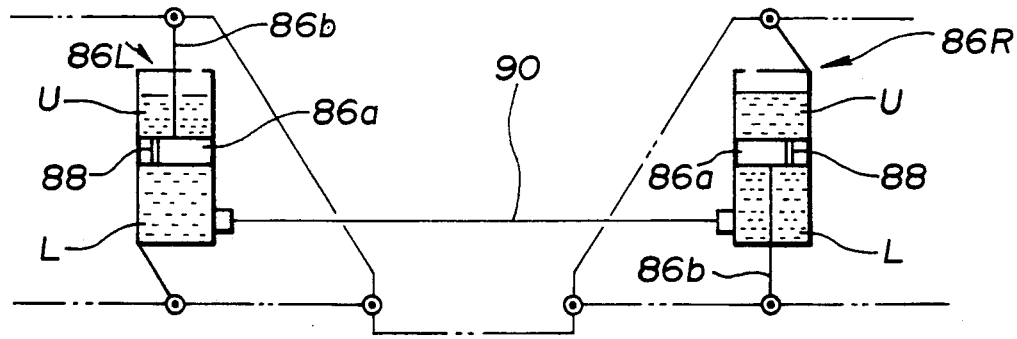
Figure 10:
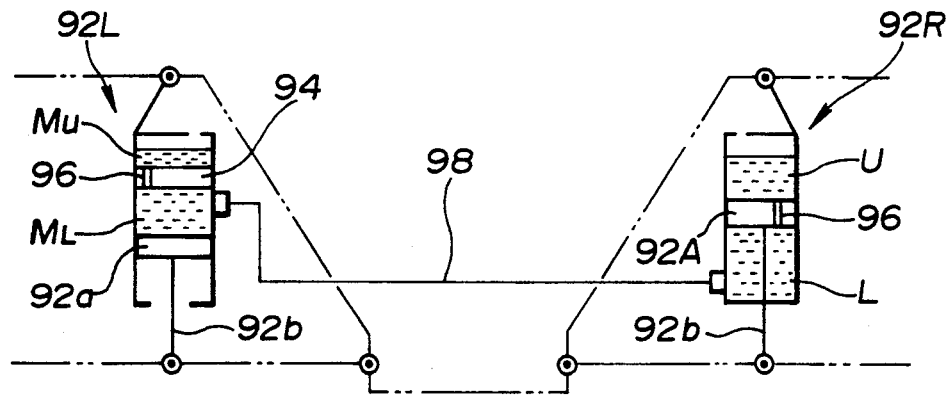

Further, the hydraulic conduits for connecting the hydraulic cylinders can be arranged as shown in FIGS. 9 and 10. In the arrangement of FIG. 9, single rod-single acting hydraulic cylinders 86L and 86R, one of which is inverted relative to the other, are installed on the laterally opposed left and right sides of the vehicle body, and pistons 86a and 86a are respectively formed with restrictions 88 and 88 through which the upper and lower cylinder chambers U and L are communicated with each other while the lower cylinder chambers L and L are connected to each other by means of a conduit 90. In Indicated by 86b is a piston rod. With this arrangement, the same effect to those of the previous embodiments can be obtained and the arrangement can be attained with a single conduit.

Further, in the arrangement of FIG. 10, the hydraulic cylinders 92L and 92R are installed in the same manner, the left wheel side hydraulic cylinder 92L of which is provided with a cylinder chamber which is defined by a piston 92a and also provided with a piston rod 92b connected to the wheel side. The cylinder chamber of the left wheel side hydraulic cylinder 92L is separated into upper and lower chambers MU and ML by means of a fixed or stationary piston 94. The upper and lower chambers MU and ML are communicated with each other by means of an orifice 96 provided to the stationary piston 94. The right wheel side hydraulic cylinder 92R has upper and lower cylinder chambers U and L defined by a movable piston 92A in the manner similar to that of FIG. 9 and a piston rod 92b connected to the wheel side. The lower cylinder chamber L of the right wheel side hydraulic cylinder 92R and the lower cylinder chamber ML of the left wheel side hydraulic cylinder 92L are connected to each other by a conduit 98. With this arrangement, the same effect to that by the arrangement of FIG. 9 can be attained.

Figure 11:
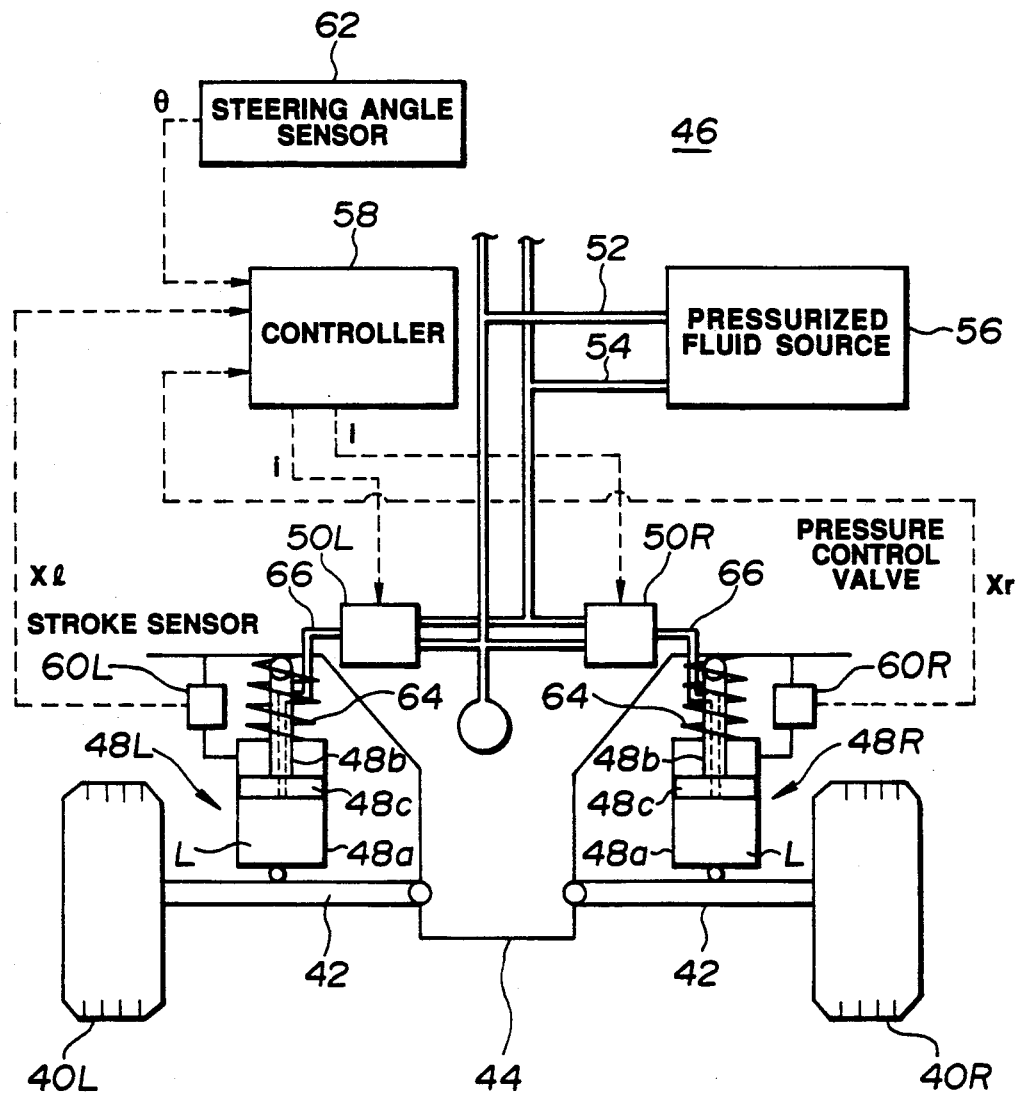

Referring to FIG. 11, a further embodiment of the present invention will be described. This damping devices also serves as a hydraulic active suspension and only a portion thereof which is applied to a pair of front left and front right wheels or rear left and rear right wheels is shown and adapted to damp roll and bounce.

In FIG. 11, 40L and 40R indicate laterally opposed left and right wheels, 42 and 42 indicate wheel side members, 44 indicates a vehicle body, and 46 indicates a damping device also serving as a hydraulic active suspension system.

The damping device 46 includes hydraulic cylinders 48L and 48R installed between the respective wheel side members 42, 42 and the vehicle body 44, pressure control valves 50L and 50R for controlling the working fluid pressures in the hydraulic cylinders 48L and 48R, a hydraulic pressure source 56 connected with the pressure control valves 50L and 50R by way of a supply conduit 52 and a return conduit 54, a controller 58 for controlling the pressure control valves 50L and 50R, stroke sensors 60L and 60R for detecting the strokes of the hydraulic cylinders 48L and 48R, and a steering angle sensor 62 for detecting a steering angle. 64 and 64 indicate coil springs.

The hydraulic cylinders 48L and 48R are of the single rod-single acting type and have cylinder tubes 48a and 48a attached to the wheel side members 42 and 42 and piston rods 48b and 48b attached to the vehicle body 44. The pistons 48c and 48c define the cylinder chambers L and L which are communicated through conduits 66 and 66 with supply or outlet ports 50L and 50R of the pressure control valves 50L and 50R. Though not shown, the pressure control valves 50L and 50R are conventional reducing valves of the solenoid-controlled three port proportional type such as for example disclosed in Japanese Patent Provisional Publication No. 1-122717 and each consist of a valve housing having slidably installed therein a spool, the spool being exposed at one end to a feedback pressure and at the other end to a pilot pressure, and a proportional solenoid for controlling the pilot pressure. By this, the pressure control valves 50L and 50R are capable of adjusting the pressures in the cylinder chambers L and L in accordance with signals i and i supplied thereto from the controller 58.

The controller 58 receives the signal $\theta$ from the steering angle sensor 62 and judges, based on the signal $\theta$, whether the vehicle is under a steered condition. When it is judged that the vehicle is not under a steered condition, signals i and i for causing cylinder strokes of the same phase are calculated from the foregoing expression (9) on the basis of the signals Xl and Xr from the stroke sensors 60L and 60R and supplied to the pressure control valves 50L and 50R. On the other hand, when it is judged that the vehicle is under a steered condition, signals i and i for causing cylinder strokes of the opposed phases are calculated from the foregoing expression (8) on the basis of the signals Xl and Xr from the stroke sensors 60L and 60R and supplied to the pressure control valves 50L and 50R similarly. In this instance, the damping coefficient C1 in the expressions (8) and (9) represents the overall of the control system.

In this embodiment, the stroke sensors 60L and 60R and pressure control valves 50L and 50R constitute a control unit, and the conduits 52, 54, 66 and the conduits in the pressure control valves 50L (50R) are mainly causative of the damping coefficient C1.

Due to this, the left and right hydraulic cylinders 48L and 48R produce damping forces proportional to stroke speeds thereof for suppressing wheel strokes or movements. In this instance, under a bounce condition, a small damping force and therefore a god riding comfort is obtained. On the other hand, under a roll condition, a large damping force is obtained for assuredly suppressing the roll. This embodiment thus can produce the same effect to the previous embodiments.

In the meantime, while the left and right wheels have been described and shown as making wheel strokes while causing relative movement therebetween, this is not limitative but the embodiment can be applied to a pair of front and rear wheel on the same lateral side of the vehicle. In such a case, it is judged on the basis of signals from a brake switch and acceleration switch whether the vehicle is under an accelerated or decelerated condition.

In the foregoing, it will be understood that the working fluid utilized in the damping device of this invention is not limited to hydraulic fluid but can be other fluid.

What is claimed is:

1. A damping device for a vehicle having a plurality of wheels and a vehicle body, comprising:
   an actuator having a pair of fluid cylinders installed between the vehicle body and two of the wheels, said cylinders having cylinder chambers, and conduit means for interconnecting said cylinder chambers; and
   damping force producing means fluidly connected to said cylinder chambers and said conduit means for producing a damping force in proportion to a flow rate of fluid therethrough;
   in which said actuator causes a larger flow rate of fluid to pass through said damping force producing means when the two wheels make strokes involving a relative movement therebetween than when the two wheels make strokes without involving any substantial relative movement therebetween.

2. A damping device as claimed in claim 1, wherein said damping force producing means is capable of producing a variable damping force for a given flow rate of fluid passing therethrough, said damping device further comprising control means for controlling said damping force producing means in such a manner that said damping force producing means produces a variable damping force in response to a variation of a running condition of the vehicle.

3. A damping device as claimed in claim 2, wherein said actuator further comprises a pair of accumulators, said fluid cylinders each having a piston and two upper and lower said cylinder chambers separated by said piston, said conduit means having a pair of first conduits connecting said upper and lower cylinder chambers of one of said fluid cylinders to said lower and upper cylinder chambers of the other of said cylinder chambers, respectively, and a pair of second conduits connecting said accumulators to said first conduits, respectively, said damping force producing means comprising a pair of variable restrictions installed in said second conduits, respectively.

4. A damping device as claimed in claim 3, wherein the two wheels are laterally opposed left and right wheels, said control means comprising a lateral acceleration sensor for detecting a lateral acceleration of the vehicle and producing a signal representative thereof and a controller for controlling said variable restrictions in response to the signal from said lateral acceleration sensor.

5. A damping device as claimed in claim 4, wherein said controller judges whether the vehicle is in a turning condition on the basis of the signal from said lateral acceleration sensor and causes said variable restrictions to reduce in opening when it is judged that the vehicle is in a turning condition.

6. A damping device as claimed in claim 5, wherein the vehicle has a pair of suspension arms installed between the vehicle body and the two wheels, said fluid cylinders being of single rod-double acting type and having cylinder tubes attached to the suspension arms, respectively and piston rods projecting upwardly from the cylinder tubes to be attached to the vehicle body.

7. A damping device as claimed in claim 6, wherein the vehicle has a pair of shock absorbers installed between the vehicle body and the respective suspension arms.

8. A damping device as claimed in claim 7, wherein the accumulators are of a hydropnuematic type.

9. A damping device as claimed in claim 1, wherein said damping force producing means produces a constant damping force for a given flow rate of fluid passing therethrough.

10. A damping device as claimed in claim 9, wherein said actuator further comprises a reservoir, said fluid cylinders being of a single rod-double acting type and each having a piston and two upper and lower said cylinder chambers separated by said piston, said conduit means having a pair of first conduits connecting said upper and lower cylinder chambers of one of said fluid cylinders to said lower and upper cylinder chambers of the other of said cylinder chambers, respectively, and a pair of second conduits connecting said reservoir to said first conduits, respectively, said damping force producing means comprising a pair of fixed restrictions installed in said second conduits.

11. A damping device as claimed in claim 10, wherein the vehicle has a pair of suspension arms installed between the vehicle body and the two wheels, respectively, said fluid cylinders further having cylinder tubes attached to the suspension arms, respectively and piston rods projecting upwardly from said cylinder tubes and attached to the vehicle body.

12. A damping device as claimed in claim 9, wherein said actuator further comprises a reservoir, said fluid cylinders being of a single rod-double acting type and each having a piston and two upper and lower said cylinder chambers separated by said piston, said conduit means having a pair of first conduits connecting said upper and lower cylinder chambers of one of said fluid cylinders to said upper and lower cylinder chambers of the other of said cylinder chambers, respectively, and a pair of second conduits connecting said reservoir to said first conduits, respectively, said damping force producing means comprising a pair of fixed restrictions installed in said second conduits, respectively.

13. A damping device as claimed in claim 12, wherein one of said fluid cylinders being disposed in an inverted manner relative to the other of said fluid cylinders.

14. A damping device as claimed in claim 9, wherein said fluid cylinders being of a double rod-double acting type and each having a piston and two upper and lower said cylinder chambers separated by said piston, said conduit means having a pair of first conduits connecting said upper and lower cylinder chambers of one of said fluid cylinders to said lower and upper cylinder chambers of the other of said cylinder chambers, respectively, and a second conduit interconnecting said first conduits, said damping force producing means comprising a fixed restriction installed in said second conduit.

15. A damping device as claimed in claim 9, wherein said fluid cylinders being of a double rod-double acting type and each having a piston and two upper and lower said cylinder chambers separated by said piston, said conduit means having a pair conduits connecting said upper and lower cylinder chambers of one of said fluid cylinders to said lower and upper cylinder chambers of the other of said cylinder chambers, respectively, said damping force producing means comprising a pair of fixed restrictions each formed in said piston to provide communication between said upper and lower cylinder chambers.

16. A damping device as claimed in claim 2, wherein said fluid cylinders being of a double rod-double acting type and each having a piston and two upper and lower said cylinder chambers separated by said piston, said conduit means having a pair of first conduits connecting said upper and lower cylinder chambers of one of said fluid cylinders to said lower and upper cylinder chambers of the other of said cylinder chambers, respectively, and a pair of second conduits interconnecting said upper and lower cylinder chambers of said respective cylinders, said damping force producing means comprising a pair of variable restrictions installed in said second conduits, respectively.

17. A damping device as claimed in claim 9, wherein said fluid cylinders being of a single rod-single acting type and each having a piston and two upper and lower said cylinder chambers separated by said piston, said conduit means having a conduit interconnecting said lower cylinder chambers of said fluid cylinders, and said damping force producing means comprising a pair of fixed restrictions each formed in said piston to provide communication between said upper and lower cylinder chambers.

18. A damping device as claimed in claim 9, wherein said fluid cylinders being of a single rod-single acting type, one of said fluid cylinders having a piston and two upper and lower said cylinder chambers separated by said piston and the other of said fluid cylinders having a piston defining on one side thereof a fluid chamber and a partition separating said fluid chamber into two upper and lower said cylinder chambers, said conduit means having a conduit interconnecting said lower cylinder chambers of said fluid cylinders, and said damping force producing means comprising a pair of fixed restrictions respectively formed in said piston of one of said fluid cylinders and said partition of the other of said fluid cylinders for providing communication between said upper and lower cylinder chambers.

19. A damping device for a vehicle having a plurality of wheels and a vehicle body, comprising:
a pair of fluid cylinders having cylinder chambers and interposed between the vehicle body and two of the wheels, respectively;
damping force producing means fluidly connected to said cylinder chambers for producing a damping force in proportion to a flow rate of fluid therethrough; and
control means for controlling such that a larger flow rate of fluid is caused to pass through said damping force producing means when the two wheels make strokes involving a relative movement therebetween than when the two wheels make strokes without involving any relative movement therebetween.

20. A damping device as claimed in claim 19, wherein said fluid cylinders are of a single rod-single acting type and each having a piston and a cylinder chamber defined by said piston, said damping force producing means comprising a pressurized fluid source, conduit means for connecting said pressurized fluid source to said cylinder chambers of said fluid cylinders, and a pair of pressure control valves disposed in said conduit means for controlling supply of pressurized fluid from said pressurized fluid source to said cylinder cylinder chambers.

21. A damping device as claimed in claim 20, wherein said control means comprises a steering angle sensor for detecting a steering angle and producing a signal representative thereof, a pair of stroke sensors for detecting strokes of said fluid cylinders and producing signals representative thereof and a controller for controlling said pressure control valves in accordance with the signals from said steering angle sensor and said stroke sensors.

22. A damping device as claimed in claim 21, wherein the vehicle further has suspension arms disposed between the vehicle body and the two wheels, respectively, said fluid cylinders being installed between said suspension arms and the vehicle body.

* * * * *